United States Patent Office 2,979,434
Patented Apr. 11, 1961

2,979,434
POLYAMINE NEMATOCIDES
Philip H. Santmyer, Robertson, Mo., assignor to Monsanto Chemical Company, St. Louis, Mo., a corporation of Delaware
No Drawing. Filed Dec. 7, 1953, Ser. No. 396,784
8 Claims. (Cl. 167—22)

This invention relates to methods of inhibiting both the endoparasitic and ectoparasitic nematodes, and other parasitic worm life which exist in the soil at some stage of their life cycles, for example eggs, larvae and adult worm. The invention is more particularly directed to providing chemicals for treating the normal environment of the parasitic worms.

The control of nematodes and other parasitic worms in soils is a complex problem because of the paucity of information on the physiology of the worms and the difficulty involved in experimentation with microscopic organisms. It is believed that many toxicants operate by the destruction of vital enzymes within the organism, however many compounds, known to be capable of reaction with enzymes, are of little effect, because of the impermeable membranes which enclose the eggs, larvae and adult parasitic worms. Some agents having fat solvency properties are known to penetrate the exterior membranes by action on fatty tissues, but such penetration will not usually kill the organism. The effective toxicant must have both the property of penetrating the resistant coatings and the ability to kill.

Even compounds which have the requisite properties of penetration and toxicity are frequently useless because it is necessary that the toxicant be applied to the environment in such a way that it comes into intimate contact with the organism. Furthermore it is necessary that it remain in the soil for a substantial period of time to effect a substantially complete kill of parasitic worms. For example, many active compounds are of limited water-solubility and volatility and therefore are difficult to disperse intimately in the soil. Furthermore, compounds of excessive volatility may be evolved from the soil before a sufficient number of the organisms are destroyed.

Even the ability to destroy nematodes and endoparasitic worms in the soil will not definitely characterize a successful soil sterilant. Many compounds toxic to animal life are also phytotoxic, and therefore if they are to be practicable as parasitic worm toxicants, the phytotoxicity must not be long-lived. The phytotoxic substances either in the form of the substance added or as decomposition residues should be such that they are removed from the soil by evaporation, by rain washing, or by soil bacterial decomposition.

For the reasons set forth above, completely effective agents for nematodes and other parasitic worm life are not generally available. Furthermore one skilled in the art cannot predict the effectiveness as practicable toxicants of compounds, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above described requisite properties. A further purpose of this invention is to provide a useful method of freeing soils from objectionable nematode life. Other purposes of this invention will be evident from the following specification.

It has now been found that certain substituted polyamines are very effective as nematocides and agents for controlling other parasitic worms. The new class of effective amino compounds have the following structural formula $$R-NH-(CH_2-CH_2-NH)_n-H$$

wherein R is an alkyl radical having from six (6) to twenty (20) carbon atoms and $n$ is an integer from one (1) to six (6). A preferred group of these nematocidal compositions are those wherein R is a straight alkyl radical having from eight (8) to eighteen (18) carbon atoms and where $n$ is an integer from one (1) to three (3).

Although it will be noted that this class of useful nematocides are surface active, having a hydrophobic alkyl radical and the hydrophilic primary and secondary amino groups, not all surface active compounds are useful. A wide variety of different surface active substances and known emulsifying agents having both hydrophobic and hydrophilic properties have been studied and found to be utterly useless as nematocides. The nature of the mechanism by which the nematodes are destroyed and the mechanism by which the compounds penetrate the protective sheath of both the nematode eggs and larvae and the adult nematode are not fully understood. Since these compounds are quite different from all other known nematocidal compounds, it appears that the specific action on the nematode is different in the present case than in other nematocidal applications.

The use of the new class of compositions in destroying or controlling the nematode populations in soil is especially advantageous in view of the fact that compounds are water dispersible and can be distributed in irrigation water or by spray application from aqueous suspensions. The fact that substantial quantities may be used without serious phytotoxic effects is also a special advantage in the practice of the present invention.

The following compounds are representative of the compounds included within the scope of the above structural formula:

N-n-hexyl ethylene diamine
N-n-octyl ethylene diamine
N-(2-ethylhexyl) ethylene diamine
N-dodecyl ethylene diamine
N-tetradecyl ethylene diamine
N-octadecyl ethylene diamine
N-n-hexyl diethylene triamine
N-n-octyl diethylene triamine
N-decyl diethylene triamine
N-hexadecyl diethylene triamine
N-(2-ethylhexyl) triethylene tetramine
N-dodecyl triethylene tetramine
N-octadecyl triethylene tetramine
N-dodecyl tetraethylene pentamine
N-hexadecyl pentaethylene hexamine Although any one or more of the above compounds may be used effectively, other types may be prepared from petroleum fractions of varying chain length, for example N-keryl diethylene triamine, or from straight chain aliphatic derivatives obtained from coconut oil. These compositions will be mixtures of compounds with different alkyl chain length.

These nematocidal compositions are effective in eliminating or controlling nematode activity when applied to the soil at the rate of 50 to 600 lbs. per acre. Preferred level of application useful in soils of average infestation will be from 100 to 200 lbs. per acre. Obviously, heavily infested areas may require the use of higher proportions and lightly infested areas may be treated effectively with smaller proportions. The compositions being water dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adaptable for use in the practice of this invention.

In addition to the use in soils, the invention may be practiced in any other nematode environment, for example greenhouse potting mixtures and other soil substitutes. Nematode environments may include rooted plants, tubers, seeds and bulbs, in which case the toxicant is used as a rinse to remove and destroy eggs, larvae and adult nematodes which may be present.

The mixtures of N-alkyl polyamines are useful in destroying endoparasitic worms other than nematodes which frequently infect barnyards or other areas frequented by domestic animals and fowl. The treatment of the surface soils in such localities will minimize infections of flukes, tapeworms and other anthelminics in the animals and fowl by destruction of eggs and larvae of the parasites during the soil phase of their life cycles.

EXAMPLE 1

In evaluating the N-alkyl polyamines as nematocidal agents, the primary screening was conducted on an aqueous nematode culture. The compounds being examined were introduced into the culture at varying concentrations representing 30 to 600 lbs. per acre, the calculation being based on a six inch depth in a soil containing 30 percent of moisture. It is known that a nematode when dispersed in water flexes its body at a more or less constant rate and that the effect of a nematocide can be estimated reasonably accurately by counting the rate of this flexing action. This motility of the nematode is observed through a microscope and the number of flexures is counted, the effect of the nematocide being expressed as a percentage of the normal flexing rate of a control dispersion not containing a nematocidal agent.

The following table sets forth the motility of the nematode at various intervals of time ranging from 10 minutes to 2 hours with the nematocide being present at the concentration of 0.1 percent.

Table I

| Compound at 0.1% Conc. | Percent Motility After— | | | | |
|---|---|---|---|---|---|
| | 10 min. | 20 min. | 30 min. | 1 hr. | 2 hrs. |
| N-tetradecyl ethylene diamine | 0 | 0 | 0 | 0 | 0 |
| N-loralkyl ethylene diamine* | 0 | 0 | 0 | 0 | 0 |
| N-dodecyl diethylene triamine | 0 | 0 | 0 | 0 | 0 |
| Mixture of N-alkyl diethylene triamines | 5 | 1 | 0 | 0 | 0 |
| N-loralkyl diethylene triamine* | 0 | 0 | 0 | 0 | 0 |
| N-(2-ethylhexyl) ethylene diamine | 0 | 0 | 0 | 0 | 0 |
| N-hexadecyl triethylene tetramine | 0 | 0 | 0 | 0 | 0 |

*See footnote—Table IV.

The motility at varying time intervals at a concentration of 0.01 percent was also determined.

Table II

| Compound at 0.01% Conc. | Percent Motility After— | | | | |
|---|---|---|---|---|---|
| | 10 min. | 20 min. | 30 min. | 1 hr. | 2 hrs. |
| N-tetradecyl ethylene diamine | 0 | 0 | 0 | 0 | 0 |
| N-loralkyl ethylene diamine* | 0 | 0 | 0 | 0 | 0 |
| N-dodecyl diethylene triamine | 1 | 1 | 0 | 0 | 0 |
| Mixture of N-alkyl diethylene triamines | 90 | 90 | 80 | 50 | 20 |
| N-loralkyl diethylene triamine* | 80 | 55 | 50 | 50 | 50 |
| N-(2-ethylhexyl) ethylene diamine | 100 | 50 | 50 | 50 | 25 |
| N-hexadecyl triethylene tetramine | 75 | 50 | 25 | 10 | 1 |

*See footnote—Table IV.

The measurements were also made at 0.005 percent for some of the alkyl polyamines.

Table III

| Compound at 0.005% Conc. | Percent Motility After— | | | | |
|---|---|---|---|---|---|
| | 10 min. | 20 min. | 30 min. | 1 hr. | 2 hrs. |
| N-tetradecyl ethylene diamine | 50 | 1 | 1 | 1 | 0 |
| N-loralkyl ethylene diamine* | 1 | 0 | 0 | 0 | 0 |
| N-dodecyl diethylene triamine | 50 | 25 | 25 | 10 | 5 |
| N-(2-ethylhexyl) ethylene diamine | 100 | 100 | 100 | 100 | 90 |

* See footnote—Table IV.

It will be noted that the above data indicates the preferred use of the straight chain compounds as compared to the branch chains.

EXAMPLE 2

Tomato plants were grown in soils treated with various N-alkyl polyamines at concentrations of 0.1 and 0.01 percent applications. At maturity the tomato plants were examined for evidence of nematode infection and phytotoxicity. All of the tomato plants were found to be free of the characteristics of phytotoxicity and were better than the controls with respect to nematode damage.

Table IV

| Compound | Nematode Damage | |
|---|---|---|
| | 0.1% Conc. | 0.01% Conc. |
| Dodecyl diethylene triamine | None | Very slight. |
| Mixtures of N-alkyl diethylene triamines | do | None. |
| N-loralkyl diethylene triamine* | Very Slight | Slight. |
| N-loralkyl ethylene diamine* | do | Do. |
| N-tetradecyl ethylene diamine | do | Very Slight. |
| N-(2-ethylhexyl) ethylene diamine | None | None. |
| N-dodecyl diethylene triamine | Very Slight | Moderate. |
| Control plants—untreated | Severe | Severe. |

*In these examples the loralkyl group represents a mixture of alkyl groups having 10, 12, 14, 16, and 18 carbon atoms.

What is claimed is:

1. A method of controlling endoparasitic worms which comprises treating soil infested by said worms with a composition containing a quantity toxic to said worms of a compound having the structure

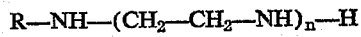

wherein R is an alkyl radical having from six (6) to twenty (20) carbon atoms and n is an integer from one (1) to six (6).

2. The method defined by claim 1 wherein the treating compound is N-dodecyl diethylene triamine.

3. The method defined by claim 1 wherein the treating compound is N-tetradecyl ethylene diamine.

4. The method defined by claim 1 wherein the treating compound is N-loralkyl diethylene triamine.

5. The method defined by claim 1 wherein the treating compound is N-loralkyl ethylene diamine.

6. The method defined by claim 1 wherein the treating compound is N-hexadecyl triethylene tetramine.

7. A method of inhibiting the nematode populations in soils which comprises treating a nematode infested soil with a nematode toxic quantity of a compound of the structure

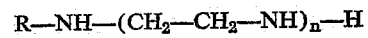

wherein R is a straight alkyl radical having from eight (8) to eighteen (18) carbon atoms and where n is an integer from one (1) to three (3).

8. A method of destroying the soil phase of endoparasitic worms which comprises injecting into worm infested soils with substantially uniform distribution to the depth of cultivation from 50 to 600 pounds per acre of $$R-NH-(CH_2-CH_2-NH)_n-H$$

wherein R is a straight alkyl radical having from eight (8) to eighteen (18) carbon atoms and where $n$ is an integer from one (1) to three (3).

References Cited in the file of this patent

UNITED STATES PATENTS

| 2,244,712 | Kyrides | June 10, 1941 |
| 2,246,524 | Kyrides | June 24, 1941 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Giolito | Nov. 13, 1956 |
| 2,802,021 | Heininger | Aug. 6, 1957 |
| 2,802,818 | Wheeler | Aug. 13, 1957 |
| 2,802,831 | Wheeler | Aug. 13, 1957 |
| 2,809,983 | Heininger | Oct. 15, 1957 |

OTHER REFERENCES

Frear: Chem. of Insecticides, Fungicides and Herbicides, 2nd ed., September 1948, pp. 108–122.